United States Patent
Rossi et al.

[11] 3,940,239
[45] Feb. 24, 1976

[54] ROTARY REDUCING KILN SEAL

[75] Inventors: Eugene F. Rossi, Milwaukee; Daryl R. Konzal, Colgate, both of Wis.

[73] Assignee: Allis-Chalmers Corporation, Milwaukee, Wis.

[22] Filed: Dec. 16, 1974

[21] Appl. No.: 533,321

[52] U.S. Cl. .................................. 432/115; 34/242
[51] Int. Cl.² ...................... F27B 7/24; F26B 25/00
[58] Field of Search ..................... 432/115; 34/242

[56] References Cited
UNITED STATES PATENTS

| | | | |
|---|---|---|---|
| 3,098,260 | 7/1963 | Richeson | 34/242 X |
| 3,724,887 | 5/1971 | Roberts | 432/115 |

FOREIGN PATENTS OR APPLICATIONS

| | | | |
|---|---|---|---|
| 1,202,207 | 9/1965 | Germany | 432/115 |

*Primary Examiner*—John J. Camby
*Attorney, Agent, or Firm*—Arthur M. Streich

[57] ABSTRACT

A seal is disclosed between a stationary hood and an end of a rotary kiln enclosed thereby to prevent entrance of atmospheric air or the exit of process gas. The seal includes a first annular seal ring on a flange to rotate with the kiln, and a second and nonrotating annular seal ring mounted on an axially movable cylinder arranged around the kiln. The cylinder is part of a movable assembly that also cooperates with the kiln flange to define an annular chamber encompassing both seal rings and which is filled with a pressurized gas to prevent leakage between the rings. A thin annular flexible diaphragm around the kiln is circumferentially sealed on one end to the hood and on the other end to the movable cylinder. The diaphragm is sufficiently flexible to allow the cylinder and attached seal ring to move axially, as the kiln expands, to maintain an effective seal. A biased linkage pushes the two seal rings relatively together while thermal expansion of the kiln causes the diaphragm to fold and contraction causes the diaphragm to unfold. The diaphragm is shielded from high temperature kiln gases by an annular flexible wiper that projects inwardly of the movable cylinder to engage a stationary cylinder secured to the hood; and this wiper along with the diaphragm, hood and the stationary cylinder define a chamber filled with relatively cool pressurized gas to cool the diaphragm and resist leakage of high temperature kiln gas into the chamber defined in part by the flexible diaphragm.

3 Claims, 2 Drawing Figures

ROTARY REDUCING KILN SEAL

BACKGROUND OF THE INVENTION

1. Field of the Invention

This invention relates generally to a sealing arrangement between a rotatable member and a stationary member which are arranged in material flow relation with each other, the seal serving to restrict the entrance of atmospheric gas into or the exit of process gas from the region of the junction between the relatively rotatable members, and in particular to a seal between an end of a generally horizontal rotary mineral reducing kiln and a hood surrounding an end thereof.

2. Description of the Prior Art

Seals between the stationary rotating parts of kilns are illustrated and described in U.S. Pat. Nos. 3,042,489, D. H. Giesking and 3,068,015, A. J. Roubal. Such prior art seals were designed to reduce the ingress of air from the surrounding atmosphere and/or the egress of exhaust gases from the kiln to an acceptable level so as to not significantly impair the fuel economies of the mineral processing or materially pollute the atmosphere. However, in dealing with a reducing kiln, it becomes essential to eliminate any ingress of air from the surrounding atmosphere into the kiln, because air entering the kiln after reduction has taken place will reoxidize reduced material. Furthermore, the gas within a reducing kiln is toxic and highly explosive, so it is imperative that none of this gas be released into the atmosphere.

SUMMARY OF THE INVENTION

According to the present invention, an improved seal is providedd between a stationary hood and an end of a rotary kiln enclosed thereby to prevent entrance of atmospheric air or the exit of process gas. The seal includes a first annular seal ring on a flange which is, in turn, secured around the kiln to rotate with the kiln, and a second and nonrotating annular seal ring mounted on an axially movable cylinder arranged around the kiln. The cylinder is part of an axially movable assembly that also cooperates with the kiln flange to define an annular chamber encompassing both seal rings and which is filled with a pressurized gas to prevent leakage of kiln gas outwardly or air inwardly between the rings. A thin annular flexible diaphragm around the kiln is circumferentially sealed on one end to the hood and on the other end to the axially movable cylinder. A biased linkage pushes the two seal rings relatively together while thermal expansion of the kiln moves the seal rings toward the hood and causes the diaphragm to fold, the contraction of the kiln causes the diaphragm to unfold, with an effective seal being thereby maintained under variable operating conditions.

In a preferred embodiment of the invention, the thin flexible diaphragm is shielded from high temperature kiln gases by an annular flexible wiper that projects inwardly of the movable cylinder to engage a stationary cylinder secured to the hood; and this wiper along with the diaphragm, the hood and the stationary cylinder define a chamber filled with relatively cool pressurized gas to cool the diaphragm and resist leakage of high temperature kiln gas past the wiper and into the chamber defined in part by the flexible diaphragm.

BRIEF DESCRIPTION OF THE DRAWINGS

Additional features and advantages of the invention will become apparent from the following description taken in conjunction with the accompanying drawings in which.

DESCRIPTION OF THE PREFERRED EMBODIMENT

Figure 1:
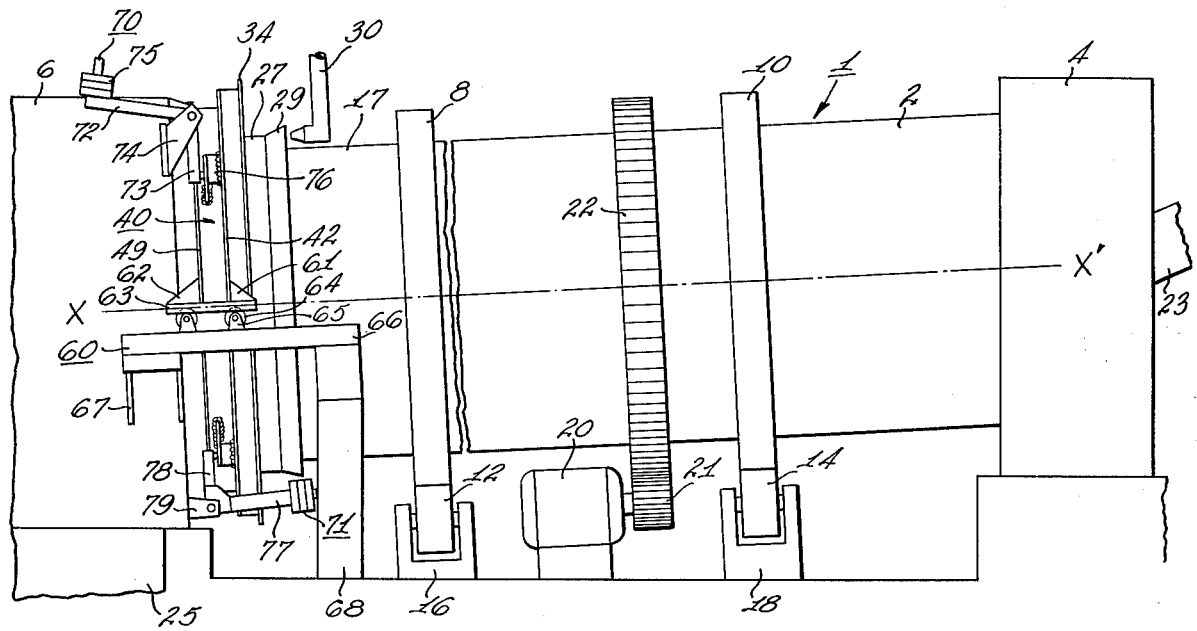
FIG. 1 is a view in longitudinal elevation of a rotary reduction kiln having a rotary kiln cylinder which rotates with respect to a stationary material discharge and firing hood at one end and with respect to a stationary feed hood at the opposite end.

Referring now to FIG. 1, there is shown a rotary reduction kiln generally indicated at 1 which may be of the type used for reducing ore to a lower state of oxidation. The rotary kiln 1 comprises an elongated rotary cylinder or kiln shell 2 which rotates with respect to a stationary material feed hood 4 and also with respect to a stationary material discharge hood 6. The shell 2 of the kiln may be supported for rotation by a pair of axially spaced annular girth rings 8 and 10 carried for rotation about a central axis $x$—$x'$ by rollers 12, 14 which in turn are rotatably contained in conventional journal bearings 16 and 18, respectively. The kiln shell 2 is carried by the rollers 12, 14 with the central axis $x$—$x'$ inclined downwardly at a slight angle from the feed hood 4 to the discharge hood 6. Rotation or oscillation of the kiln body may be provided by any conventional means and herein is shown as including a motor 20 which drives a gear 21 in mesh with an annular girth gear 22 connected to the kiln shell 2.

Suitable chute-like means 23 is provided at the feed hood 4 for delivering into the interior of the kiln material such as ore or the like which is to be processed and the material discharge hood 6 has an opening 24 (see FIG. 2) and a passage therethrough through which the processed ore may pass from the kiln through a duct 25 (in FIG. 1) to a cooler (not shown).

Figure 2:
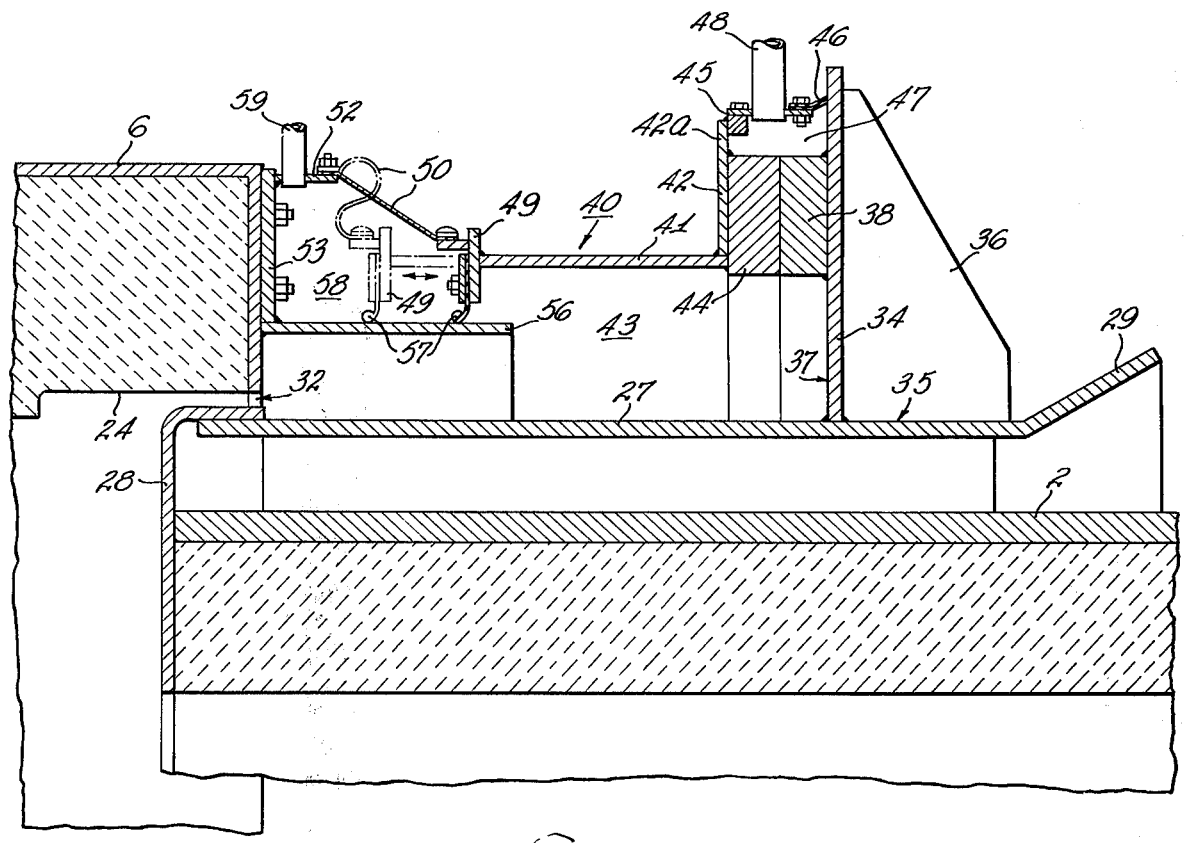
FIG. 2 is a detailed view of the improved sealing arrangement of the invention as applied to the junction between the rotating kiln cylinder and the stationary material discharge hood.

To provide cooling of the rotary kiln shell 2 in the region where it enters the stationary discharge hood 6, kiln shell 2 includes a cooling shroud 27 which is suitably mounted on and extends around the entire periphery of the outer surface of the kiln shell 2. For purposes of the specification and claims, the cooling shroud 27 is considered part of the rotating kiln shell 2. As shown in FIG. 2, the end of cooling shroud 27 received within material discharge hood 6 is closed air tight by any suitable means 28 to prevent entrance of air from the cooling shroud into the kiln. The opposite end of the cooling shroud, i.e., the right-hand end as shown in FIG. 1, is open and is provided with an outwardly flared end surface 29 which directs blasts of cooling air from a suitable source, such as an air nozzle 30, into cooling shroud 27 for cooling kiln shell 2. Cooling shrouds, such as 27, are well known in the art and form no part of this invention.

The diameter of opening 24 in discharge hood 6 must be sufficient to receive the rotating shell structure including the cooling shroud 27 and enable the shell structure to rotate freely therein. Thus an annular clearance indicated at 32 (FIG. 2) is provided between the cooling shroud 27 and the periphery of opening 24 in the stationary hood 6.

During the operation of the kiln from its cold condition to its normal operating temperature, the rotary shell 2 thermally expands or elongates for as much as five inches in length in a typical installation, the kiln shell contracting by this same distance when it cools down from operating temperatures to its cold temperature. The sealing arrangement about to be described accommodates such expansion and contraction while maintaining an effective seal.

Description of Sealing Arrangement

Referring to FIG. 2, an annular flange 34 is attached to the radially outer surface 35 of cooling shroud 27, as by welding. The flange 34 may be structurally supported by a plurality of circumferentially spaced gussets 36, one of which appears in FIG. 2. Secured to a surface 37 of flange 34 intermediate the radial length of flange 34 is an annular seal ring 38. Flange 34 and the annular seal ring 38 mounted thereon rotate with the rotating kiln shell 2.

An axially movable assembly 40 is arranged and supported, as will be described later, between the hood 6 and the radial flange 34. The assembly 40 includes a cylinder 41 having a radial flange 42 projecting radially outward of and circumferentially connected to an axial end of cylinder 41 that faces the rotating flange 34 and seal ring 38 carried by the kiln shell 2. The assembly 40 defines an annular space 43 around kiln 2 and shroud 27 which is enclosed on one end by a second, and nonrotating, seal ring 44 mounted on flange 42 to engage the rotating seal ring 38 in rubbing frictional contact resistant to gas flow therebetween. A portion 42a of flange 42, radially outward of seal ring 44, functions along with an axially short cylinder 45 connected to the outer circumference flange portion 42a and a flexible annular sealing wiper 46 circumferentially sealed to cylinder 45, as wall defining means.

The wiper 46 of such wall defining means (42a, 45, 46) engages the rotating flange 34 radially outward of seal ring 38 and in rubbing contact resistant to gas flow therebetween, and the wall means 42a, 45, 46 thereby cooperates with flange 34 to define an annular purge chamber 47 encompassing both of the seal rings 38, 44. The wiper 46 may be of any flexible sealing material, such as Teflon, and may be reinforced by spring fingers (not shown) to maintain the wiper in sealing engagement with flange 34.

At one or more locations circumferentially of the purge chamber 47, an inlet pipe 48 communicates through an opening in wall 45 to admit into the chamber 47 a nonreactive purge gas having a higher pressure than atmospheric pressure to prevent creepage of atmospheric air radially inwardly past the interface between the wiper 46 and flange 34, and between the relatively rotatable seal members 38 and 44. This is particularly important where the kiln is a rotary reduction kiln for reducing ore to a lower state of oxidation because the entrance of air into the interior of the kiln would tend to reoxidize the charge of metallic ore which is in a reduced state by the time it reaches the discharge end 17 of the kiln. The pressure of the purge gas preferably should also be such as to prevent the flow of kiln process gas radially outwardly through the interface between the relatively rotatable seal rings 38 and 44. By "nonreactive" purge gas is meant a gas which is essentially nonreactive with the atmosphere inside the rotary reduction kiln. For example, if the seal is used on a rotary reduction kiln, the purge gas should preferably either be a neutral gas, such as nitrogen, or by reducing in nature, such as methane, hydrogen or carbon monoxide; or cooled process gas withdrawn from the system at a location where it is substantially neutral.

Because of the thermal expansion and contraction of kiln shell 2, which results in an axial movement of flange 34 and the rotating seal ring 38, which can be as much as five inches, the axially movable assembly 40 (comprising parts 41 through 49) must also be capable of moving such a distance to maintain sealing contact between seal rings 38, 44 and between wiper 46 and flange 34. In order to exclude air from kiln 2 and prevent process gas escaping therefrom while the assembly 40 is moving axially to maintain the seals at 38, 44 and 46, 34, still another seal is provided between the assembly 40 and hood 6 to complete an enclosure about the space 43. Such a seal is provided by a thin flexible collapsible diaphragm 50 having a shape of a frustum of a cone, and preferably made of segments of stainless steel foil backed by a cloth woven of asbestos fibers. Such a diaphragm 50 is shown as being connected in sealing relation between hood 6 and the assembly 40 in a manner that will now be described.

To provide for the aforesaid utilization of such a diaphragm 50, an annular flange 49 may be coaxially connected to the end of cylinder 41 facing hood 6, with the flange 49 projecting both radially outward and radially inward of cylinder 41. The end of the diaphragm 50 having the smaller diameter may be sealed by any suitable means to a radially outer portion of the annular flange 49. The end of the diaphragm 50 having the larger diameter may be sealed to a short cylinder 52 connected to an annular bracket 53 attached to hood 6 concentrically about the hood clearance space 32. Thus a complete enclosure is provided around the annular clearance 32, which comprises the following parts connected in series from hood 6 to kiln 2: the bracket 53; cylinder 52; diaphragm 50; flange 49; the assembly 40 (parts 41-49) and the flange 34 with the attached seal ring 38. When kiln 2 expands as it is heated, the kiln moves flange 34 and seal ring 38 to push the assembly 40 toward hood 6 to fold and collapse diaphragm 50 to a position and configuration as shown in FIG. 2 with broken lines.

In a preferred embodiment of the apparatus, means are provided to shield the flexible diaphragm 50 from high temperature kiln process gases. Kiln process gases passing through clearance 32 and into the space between cylinder 41 and shroud 27, may be over 2,000° Fahrenheit and prolonged exposure of diaphragm 50 to such high temperature gases is undesirable in order to ensure a long useful life for the thin flexible diaphragm. To provide such protection, a stationary cylinder 56 concentric to kiln 2 is connected to hood 6 to project axially, at least in part, into the annular space 43 between the shroud 27 and axially movable cylinder 41. The cylinder 56 may be connected to hood 6 by welding cylinder 56 to bracket 53. A flexible annular wiper 57 is connected to the flange 49 and projects inwardly into engagement with the outer periphery of the stationary cylinder 56 to provide a wiping seal therebetween as wiper 57 is carried by the assembly 40, upon thermal expansion of the kiln 2, from the position shown in solid lines to the position shown in broken lines. The cylinder 56 and wiper 57, along with parts 49 through 53, define a second annular purge chamber 58. To purge chamber 58, a gas inlet pipe 59 communicates therewith through an opening in cylinder 52. A relatively cool pressurized gas is admitted through pipe 59 into chamber 58 to resist leakage between cylinder 56 and wiper 57, and to cool diaphragm 50 below temperature it may reach as a result of heat conducted thereto via the connection with the assembly 40 which is directly exposed to high temperature process gas enclosed therein. Since the flexible diaphragm 50 provides a seal between the hood 6 and cylinder 41 that is very effective to prevent leakage of process gas from the kiln 2 to the surrounding atmosphere, this means readily available process gas from kiln 2, cooled to below kiln operating temperature, may be admitted to chamber 58 for the purposes described.

With reference to FIG. 1, support means will now be described which carry the assembly 40 to accommodate the movement thereof which has been described. Such description will be followed by a description of means for biasing the assembly 40 to move on the support means toward and into sealing engagement at 44, 38 and 46, 34.

The support means comprise a pair of identical assemblies 60, one of which can be seen in FIG. 1 with another being hidden from view on the opposite side of the kiln. Each support assembly 60 comprises a pair of brackets 61, 62 which are respectively rigidly connected to the flanges 42 and 49 which are part of the axially movable assembly 40. The two brackets 61, 62 support a track 63 which rides on a pair of rollers 64. The rollers 64 are in turn supported by bearing brackets 65 mounted on a beam 66 which is suitably supported by the stationary structures 67, 68. Thus as the axially movable assembly 40 moves back or forth in response to thermal expansion or contraction of the rotary kiln shell 2, assembly 40 is supported and guided for movement by the cooperation between the track 63 and the roller 64. The support assembly 60 is positioned to guide the axially movable assembly 40 along an inclined path having substantially the same angle of inclination relative to the horizontal plane as the central axis x—x' of kiln shell 2.

Suitable biasing means for maintaining sealing contact between the parts 38, 44 and 34, 46 may be constructed and arranged to constantly exert a biasing pressure against the flange 42 of the axially movable assembly 40 to maintain the seal ring 44 in constant sealing engagement with the seal ring 38, and the wiper 46 in constant sealing engagement with the flange 34. One way of providing the biasing pressure is through the use of counterweighted bellcranks generally indicated at 70 and 71, which are suitably supported for pivotal movement on the hood 6. The bellcrank 70 will be described as typical of the four bellcranks (70 and 71 plus tow identical bellcranks on the opposite side of the kiln shielded from view) although some minor variations occur between the upper bellcrank 70 and the lower bellcrank 71 which will be described. The bellcrank 70 includes two arms 72, 73 which are at close to right angles to each other, and a fulcrum 74 mounted on hood 6. The arm 72 of the bellcrank 70 carries a plurality of weights 75 which tend to turn the bellcrank 70 counterclockwise around its fulcrum 74 as viewed in FIG. 1. The lower arm 73 of the bellcrank 70 is thus constantly urged in a counterclockwise direction as viewed in FIG. 1 and into engagement with a member 76 which is rigidly secured to the outer peripheral surface of the axially movable cylinder 41 and the flange 42. Thus, with respect to the views of FIGS. 1 and 2, the action of the bellcrank 70 is to constantly urge the axially movable cylinder 41 and hence, the entire assembly 40 including the nonrotatable seal ring 44 toward the flange 34 and into constant engagement with the rotatable seal ring 38. At the same time, this biasing action of bellcrank 70 urges the wiper 46 into sealing engagement with the flange 34. The construction of bellcrank 71 is similar to that described, except that the position of its arm 77 relative to a fulcrum 79 is axially reversed and its arm 78 is inverted, as compared to bellcrank 70, and the motion about fulcrum 79 is clockwise rather than counterclockwise as it is about fulcrum 74. The action of bellcrank 71, however, urges the assembly 40 toward flange 34 to maintain effective seals in the same manner as does bellcrank 70.

Operation

The parts as shown in FIG. 2 of the drawings represent the cold condition of the kiln before any thermal expansion of the kiln takes place due to rise from cold starting temperature to operating temperature. As the kiln is brought up to operating temperature, the shell 2 expands to the left relative to the view in FIG. 2 moving further inwardly into the end opening 24 of the hood 6. As the kiln shell 2 moves to the left, the annular flange 34 and the seal ring 38 mounted thereon will, of course, also move to the left. The nonrotatable seal ring 44 and the axially movable cylinder 41 on which ring 44 is mounted, will be pushed to the left by the movement of rotatable seal ring 38, and the wiper 57 will slide to the left along the radially outer surface of the cylinder 56 and along with a cool gas admitted at 59 will protect the flexible diaphragm 50 from high temperature kiln gases. The flexible diaphragm 50 bounding secondary purge chamber 58 will fold or collapse in somewhat like an accordion effect to accommodate the movement of the axially movable cylinder 41 in response to the axial movement of flange 34, and diaphragm 50 maintains a seal of great integrity between hood 6 and cylinder 41 for all positions of kiln 2 relative to hood 6. During the expansion movement of kiln shell 2, the primary purge chamber 47 will maintain its same relative position as shown in the view of FIG. 2 since the annular wall 42a, which represents the radially outer boundary of purge chamber 47, and the wiper 46 attached to the cylindrical wall 45, are moved to the left by flange 34 when kiln 2 expands, while simulataneously being biased to the right by the bellcranks 70 and 71. High temperature gases from kiln 2 passing through clearance 32 will, therefore, be trapped in the annular space 43 and unable to escape through either axial end of the axially movable cylinder 41, and likewise, atmospheric air will be unable to find its way into space 43 or kiln 2.

From the foregoing detailed description of the present invention, it has been shown how a reducing kiln is provided with a seal between the rotating shell and a stationary hood, which is effective despite substantial thermal expansion and contraction and a thin flexible diaphragm utilized in the invention is protected from direct and indirect overheating thereof by high temperature kiln gases. However, modifications and equivalents of the disclosed concepts such as readily occur to those skilled in the art are intended to be included within the scope of this invention.

The embodiments of the invention in which an exclusive property or privilege is claimed are defined as follows:

1. In a generally horizontal rotary mineral reducing kiln having a stationary hood surrounding one end of the kiln, a sealing assembly for preventing the passage of gas through an annular clearance space between the hood and the kiln, the sealing assembly comprising:
   a. an annular flange secured to and extending radially outward from the kiln and axially spaced from the hood;
   b. a first annular seal ring secured concentrically on the flange to rotate with the flange and the kiln;
   c. an axially movable assembly comprising a cylinder spaced around the kiln between the hood and the first seal ring, a second annular seal ring concentrically connected to an end of the movable cylinder for engagement with the first seal ring, wall means connected to the movable cylinder are arranged with a portion thereof radially outward of the seal rings for cooperating with the annular flange on the kiln to define an annular chamber encompassing the first and second seal rings, and gas delivery means connected to the annular chamber for introducing pressurized purge gas into the annular chamber to prevent leakage of other gas between the first and second seal rings;
   d. an annular flexible diaphragm spaced around the kiln with an axial end thereof adjacent the cylinder of the floating assembly being circumferentially connected thereto in gas sealing relation, and an opposite end adjacent the hood being circumferentially connected to the hood in gas sealing relation;
   e. means engaging the movable assembly and biased to push the movable assembly toward the annular flange on the kiln and maintain the second seal ring in engagement with the first seal ring; whereby upon thermal expansion of the kiln the flange and first seal ring will push the movable assembly to fold the flexible diaphragm, upon contraction of the kiln the biased means will push the movable assembly to expand the flexible diaphragm and toward the first seal ring, and with an effective seal being thereby maintained under variable operating conditions;
   f. a cylindrical guide member which is circumferentially connected to the hood substantially concentric to the kiln and projects at least in part into an annular space between the outer periphery of the kiln and the inner periphery of the cylinder of the movable assembly; and
   g. an annular flexible wiper which is circumferentially connected to the movable cylinder and projects radially inward thereof into engagement with the other periphery of the cylindrical guide member to shield the flexible diaphragm from high temperature gases within the kiln.

2. An apparatus according to claim 1 in which the annular chamber encompassing the first and second seal rings, is in turn sealed by an annular flexible sealing wiper which is secured to the wall means of the floating assembly radially outward of the first and second seal rings, and which engages the flange on the kiln.

3. An apparatus according to claim 1 in which a means is connected to the hood for introducing a pressurized purge gas at a temperature lower than the temperature of gases in the kiln, into the annular space defined by the flexible diaphragm, the second annular wiper, cylindrical guide member and the hood, to cool the flexible diaphragm and resist any tendency of higher temperature kiln gases leaking between the second wiper and the cylindrical guide member, into such annular space.

* * * * *